United States Patent [19]

Needham

[11] Patent Number: 4,559,815
[45] Date of Patent: Dec. 24, 1985

[54] TESTING DEVICE FOR FUEL INJECTORS

[75] Inventor: Arthur M. Needham, Camberley, England

[73] Assignee: Tectron (ENG) Ltd., Surrey, England

[21] Appl. No.: 577,380

[22] Filed: Feb. 6, 1984

[30] Foreign Application Priority Data

Feb. 8, 1983 [GB] United Kingdom ............ 8303407

[51] Int. Cl.⁴ ........................................ G01M 15/00
[52] U.S. Cl. .................................. 73/119 A; 73/49.7
[58] Field of Search ........................ 73/119 A, 49.7; 251/325

[56] References Cited

U.S. PATENT DOCUMENTS 3,765,454 10/1973 Carl ............................... 251/325 X
4,428,228 1/1984 Banzhaf et al. ................ 73/49.7 X

FOREIGN PATENT DOCUMENTS 1320209 6/1973 United Kingdom .

Primary Examiner—Jerry W. Myracle
Attorney, Agent, or Firm—Schwartz, Jeffery, Schwaab, Mack, Blumenthal & Evans

[57] ABSTRACT

A known type of fuel injector has a discharge passage which can be closed off by a tip sealing valve and provision for circulating fuel in the vicinity of the discharge passage. In order to test that the passage is completely closed by the tip sealing valve, the passage is closed, and the injector is blocked off from the supply and return lines while remaining full of fuel. An attempt is made to introduce more fuel into the injector and, if a significant amount can be introduced, it means that there is leakage from the injector, presumably through the discharge passage.

16 Claims, 4 Drawing Figures

TESTING DEVICE FOR FUEL INJECTORS

This invention relates to a method of, and apparatus for use in, testing fuel injectors of the type which comprise a fuel discharge passage having a tip sealing valve for controlling the discharge of fuel through the passage. While the passage is sealed by the tip sealing valve, fuel can be circulated along a path in the injector which passes adjacent to the discharge passage. In this way, when the injector has been shut down, the circulating fuel provides cooling to the injector to protect it from heat radiated from the burner or furnace of which the injector forms part.

Fuel injectors of this type are known, for example, from the specification of British Pat. No. 1426060.

When the injector is in the shut down condition, with fluid circulating adjacent to the discharge passage, any leakage through the passage due to a faulty tip sealing valve will allow fuel to the discharged to the furnace which may cause a hazardous condition to occur within the furnace. The testing device of the present invention serves to determine whether the tip sealing valve of such an injector is, in fact, sealing the injector discharge passage completely when the injector has been shut down and fluid is circulating through it in the vicinity of the tip sealing valve.

According to a first aspect of the present invention, in a method of testing a fuel injector of the type set forth above, the discharge passage of the injector is closed by the tip sealing valve, fuel is circulated through the injector by way of fuel supply and return lines, the supply and return lines are closed to retain fuel in the injector and an attempt is made to introduce a predetermined quantity of fuel into one of the fuel lines in communication with the injector and the success or failure of said attempt to introduce fuel indicates the presence or absence, respectively, of fuel leakage from the injector.

If the predetermined quantity of fuel can be introduced into the fuel line, this means that fuel is leaking from the injector, presumably through the discharge passage. If, within a reasonable period of time, the predetermined quantity of fuel has not been introduced into the fuel line, this indicates that there is substantially no leakage of fuel through the discharge passage.

According to a second aspect of the present invention, a device for use in testing a fuel injector of the type referred to above comprises a valve body defining fuel inlet and fuel outlet ports and fuel supply and fuel return ports, a piston displaceable in a cylinder in the body, the piston having apertures therethrough whereby, in one extreme position of the piston in the cylinder, the fuel inlet and the fuel supply ports are in communication with each other and the fuel outlet and the fuel return ports are in communication with each other, displacement of the piston from the first extreme position to the other extreme position progressively closing off said fuel supply port from the fuel inlet port and said fuel return port from the fuel outlet port and discharging the contents of the cylinder through a duct to the fuel supply port.

In use, fuel is supplied to the fuel inlet port of the device and, in the first extreme position of the piston, the fuel passes through the piston and out of the device through the fuel supply port. This port is connected to the injector and fuel returning from the injector returns to the fuel return port which, inturn, is in communication with the fuel outlet port on the device. In this way, fuel is continuously circulated through the injector. To check for leakage, an attempt is made to displace the piston from this first extreme position to the other extreme position. During the displacement of the piston, communication between the fuel inlet port and the fuel supply port and communication between the fuel outlet port and fuel return port is blocked off so that the injector remains full of fuel. If there is no leakage from the injector discharge passage, it will not be possible to force the contents of the cylinder through the fuel supply port into the injector. On the other hand, if the fuel can be introduced into the injector, it means that there is a leakage from the injector, presumably through the discharge passage due to a faulty tip sealing valve.

In order that the invention may be more readily understood, it will now be described, by way of example only, with reference to the accompanying drawings, in which.

Figure 1:
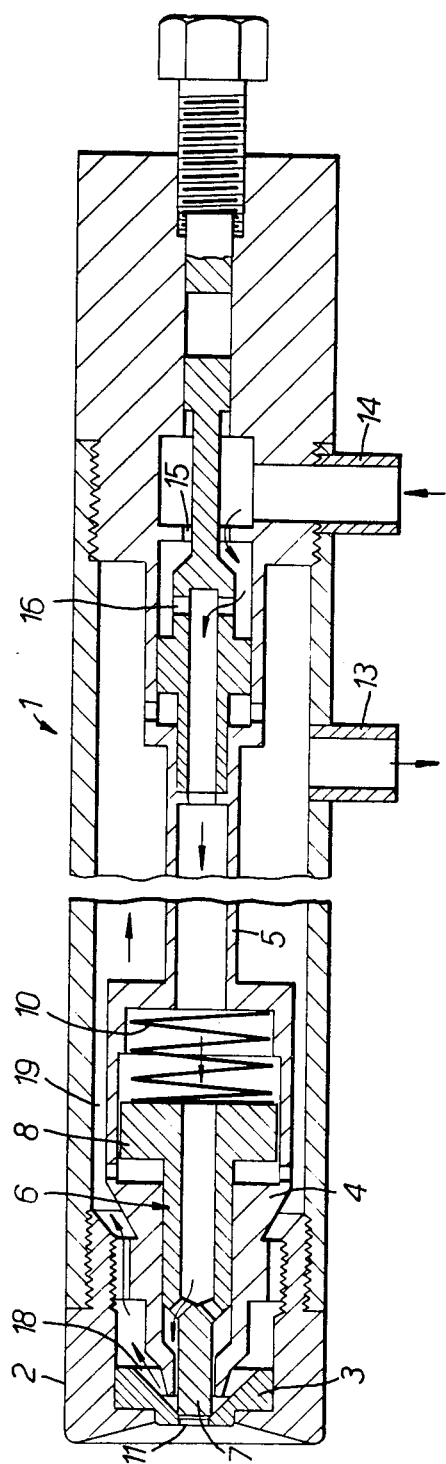
FIG. 1 is a sectional view of a known fuel injector of the type to which the present invention applies.

Referring to FIG. 1, a fuel injector includes a multi-part barrel 1 supporting at its forward end, by means of a cap nut 2, an atomizer assembly 3. The assembly is clamped within the cap nut by means of a cylindrical body 4 which is secured at its rear end to a multi-part central tube 5. A tip sealing valve 6 is disposed within the body 4 and comprises an elongate tip 7 formed on the end of a hollow stem 8. The tip sealing valve 6 is biased forwardly by a spring 10 which is sufficient to urge the tip 7 into a discharge passage 11 to close off the atomizer assembly 3.

Fluid connection ports 13 and 14 are made to the barrel 1. With the parts of the injector positioned as shown in FIG. 1, and fuel supplied to port 14 with port 13 connected to a return path, the passage of fuel through the injector is as follows: From port 14, the fuel flows through apertures 15 and 16 into the central tube 5. From this tube, it flows along the bore of the stem 8 and through an annulus between the body 4 and the valve tip 7. The fuel then flows around the valve tip and through the swirl passage 18 into the annular space 19 formed between the barrel 1 and the central tube 5 to the outlet port 13.

In this position, therefore, fuel is continuously circulating through the injector and particularly around the valve tip but, if the valve tip is correctly positioned in the atomizer assembly 3, there is no leakage from the discharge passage.

Figure 2:
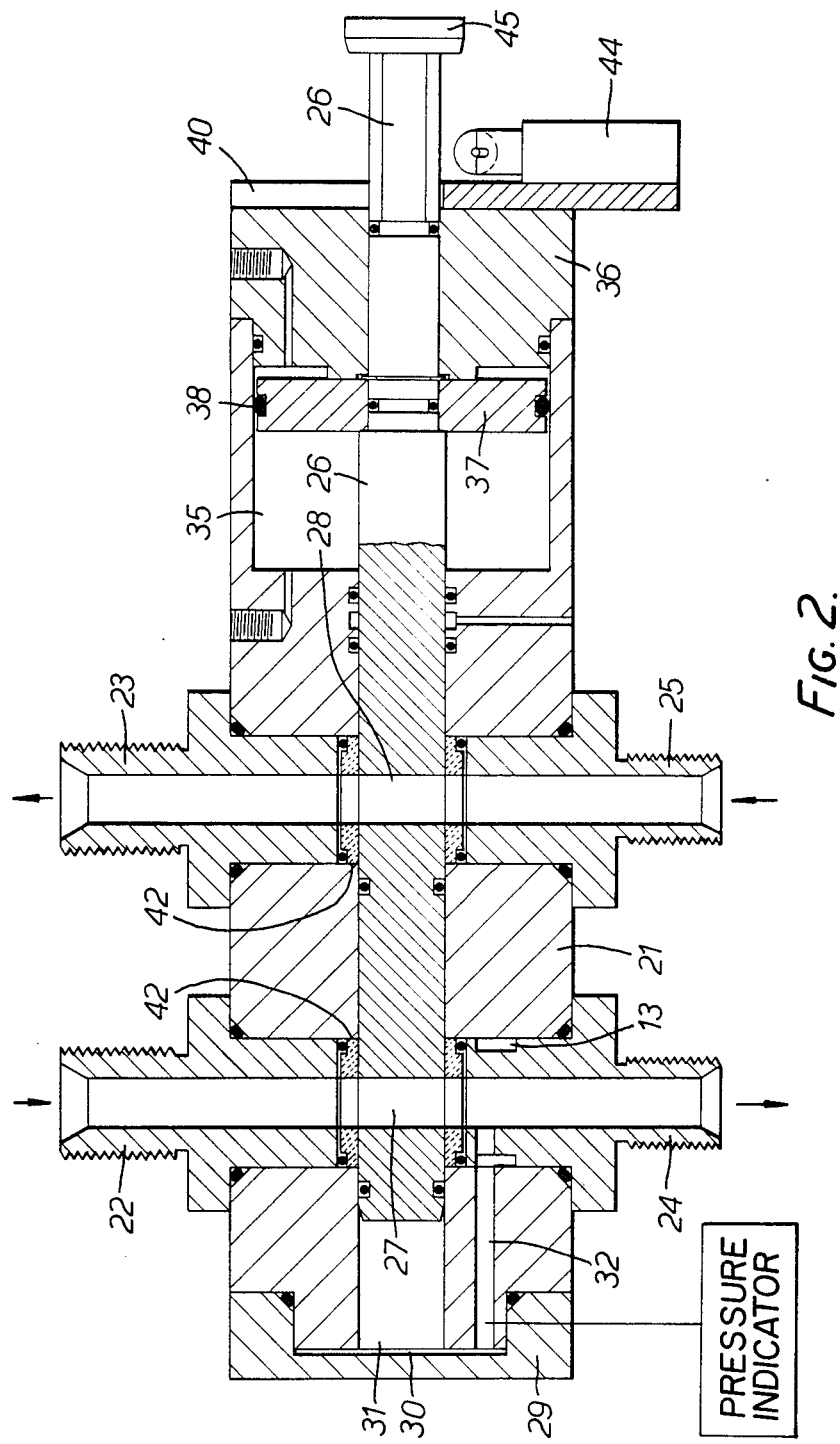
FIG. 2 is a sectional cross-section of the device according to the present invention in its non-leak test mode.
Figure 3:
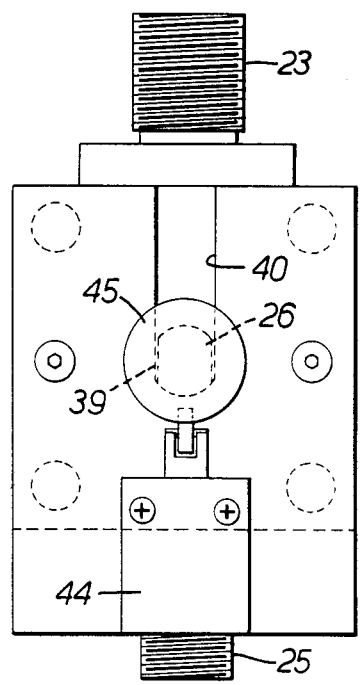
FIG. 3 is an end elevation.
Figure 4:
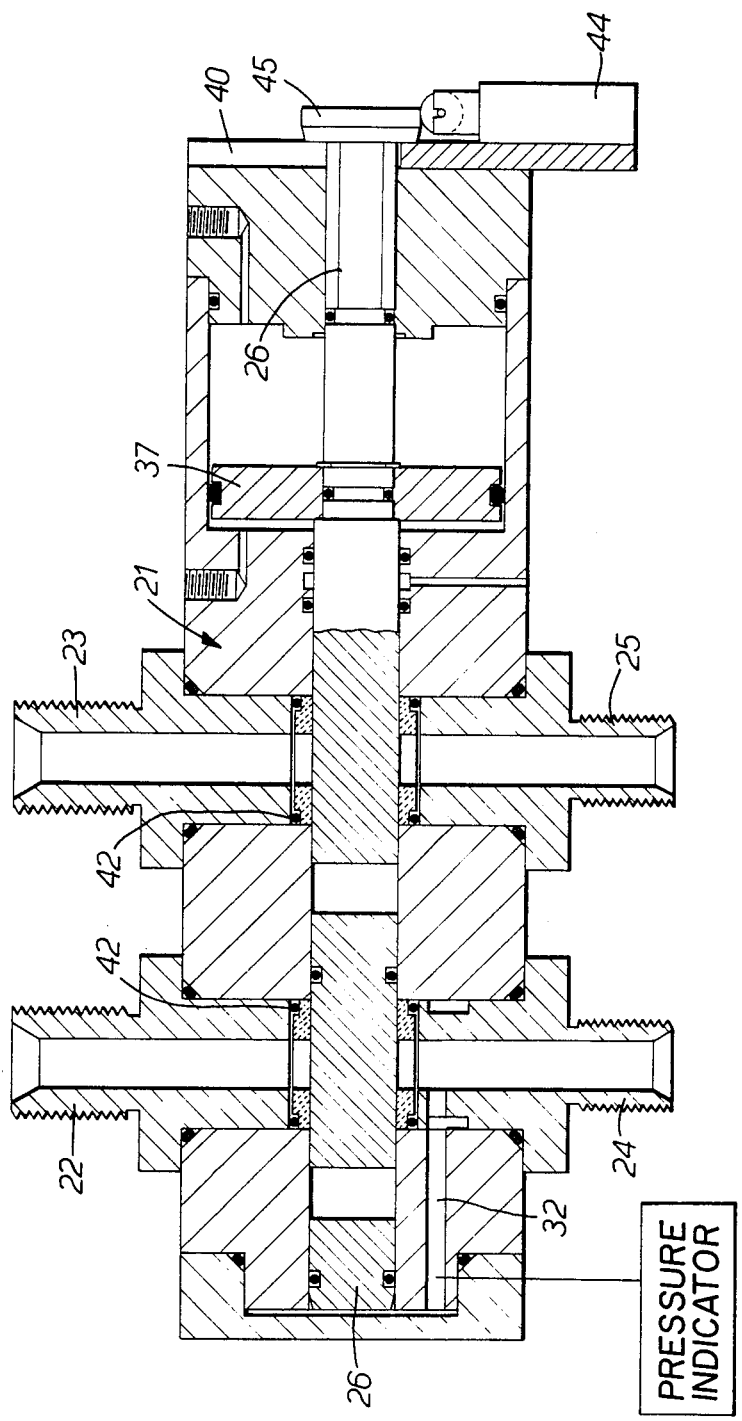
FIG. 4 is a sectional cross-section of the same device in its leak test mode.

FIGS. 2–4 show a leak testing device for an injector, such as that shown in FIG. 1. It consists of a body 21 with inlet and outlet ports 22, 23 and supply and return ports 24, 25 for connection of the device to the fluid injector. An elongate piston 26 is mounted for axial movement within the body 21 and has apertures 27, 28 through it. In one extreme position of the piston, which is the non-testing position shown in FIG. 1, apertures 27, 28 are in line with ports 22, 24 and 23, 25, respectively, so that fuel can flow freely from the fuel supply to the injector and back to the supply. At one end of the body 21, there is a cap 29 having a recess 30 which is in communication with the end of the cylinder 31 in which the piston 26 is displaceable. A bypass duct 32 connects the recess 30 with the connection part leading to the injector under test.

At the opposite end of the body 21, there is a cylinder 35 which is sealed by a cap 36. The piston 26 carries a larger diameter piston 37 having a peripheral seal 38 and this piston slides axially within the cylinder 35. Suitable connecting passages allow compressed air, or other actuating fluid, to be admitted as required to one side or other of the piston 37 to displace it and the piston 26. The piston 26 extends through the cap 36 and has flats 39 machined on a pair of opposite sides. A plate 40, with a suitable slot 41, which is a sliding fit on the portion 39, is attached to the end cap 36. This plate 40 prevents the piston 26 from rotating within the body 21 and it ensures that the apertures 27, 28 in the piston 26 are aligned with the connections 22, 24 and 23, 25 when the device is in the non-testing position.

Housed within the body 21, between the respective ports 22, 24 and 23, 25 are seal blocks 42 which are a tight sliding fit on the piston 26 and are of suitable plastics material. O-ring seals prevent fluid from leaking around the periphery of the seal blocks 42.

Attached to the plate 40 is an electrical limit switch 44 and, on the end of the piston 26 which is outside the body, there is an adjustable striker 45.

FIG. 4 shows the device in the operating mode in which a leak is detected in a fluid injector. The piston 26 has been moved axially through the limit of its stroke to its other extreme position by means of compressed air applied to the outboard area of piston 37. A volume of fluid, defined by the cross-sectional area of piston 26 and its stroke, has been displaced into the injector through the bypass duct 32, although a proportion of this fluid will be displaced into the supply and return system during the initial portion of the piston stroke where the apertures 27, 28 in the piston are not sealed completely from the connections 22, 24 and 23, 25. After the piston has moved to the position where the fluid supply and return passages are sealed by the seal blocks 42 acting on the plain cylindrical portion of the piston 26, the fluid within the injector is pressurised by virtue of the pressure acting on the area of piston 37 opposed by the fluid pressure acting on the cross-sectional area of piston 26. The area of these pistons is such that the pressure of the fluid within the injector system, when testing for leakage, is substantially above the normal maximum operating pressure.

Under this condition, there is a pressure differential between the injector side and the supply or return side of the seal blocks 42. These seals can move within the block 21, but the movement is limited by the compression of the O-rings. This movement under the pressure forces acting on the cross-sectional area of the seal blocks ensures that the fluid injector system is sealed when the seal blocks acting on the plain portion of piston 26.

If there is no leak in the injector, the force supplied to the piston will be insufficient to move it for the full extent of its movement and the striker 45 will not come into engagement with the limit switch 44. On the other hand, if there is a leakage in the injector, the piston 26 will move to the end of its stroke, the striker 45 will operate the limit switch 44 and the signal from the limit switch is used to indicate a fault condition.

The amount of movement of the piston 26, after the supply and return fluid passages have been sealed, its cross-sectional area, and the time for which compressed air is applied to piston 37, determine the minimum leakage that can be detected. This test time period is set by the time during which the fluid injector will not be damaged by the lack of fluid circulating through it. After this time, piston 26 is operated by admitting compressed air to the inboard side of piston 37 to return the piston to the normal state, allowing fluid to circulate through the injector.

In certain types of injector, the fuel lines to and from the injector include flexible hoses. it has been found that, with a device as shown in FIGS. 2–4, a false indication of leakage can occur. This is because the flexible hoses expand when the pressure in them is increased. The expansion may be such as to permit all the fuel in cylinder 31 to be introduced into the expanded fuel lines and for the head 45 to actuate the limit switch 44. Thus, the device indicates the presence of leakage, although none exists.

In an alternative arrangement to overcome this difficulty, a pressure switch is permanently connected to the duct 32. The switch is arranged to operate at a pressure which is in excess of the maximum operating pressure of the injector. To test the injector, the piston 26 is displaced until the pressure switch operates indicating that the pressure in the injector is above the maximum operating pressure. This displaced postion of the piston is maintained for a fixed period of time and, if the switch does not actuate, it means that the pressure is maintained above the operating pressure of the switch and there is no significant leakage. If the switch does operate, it indicates that there is leakage.

What I claim as my invention and desire to secure by Letters Patent is:

1. A method of testing a fuel injector of the type having a fuel discharge passage, a tip sealing valve capable of sealing the passage to control the discharge of fluid therethrough, and means for defining a path for the circulation of fuel therealong, said path including a port which lies adjacent the discharge passage, said method comprising the steps of sealing the discharge passage by the tip sealing valve; circulating fuel along said path by way of fuel supply and fuel return lines connected thereto; closing the fuel supply and fuel return lines to retain the path of the injector and the fuel lines in communication therewith full of fuel; and attempting to introduce a predetermined quantity of fuel into one of the fuel lines which is in communication with the path of the injector, the success or failure of said attempt to introduce fuel indicating the presence or absence, respectively, of fuel leakage from the injector.

2. A method as claimed in claim 1, wherein during the attempt to introduce fuel into one of the fuel lines, the fuel in the injector and fuel lines is subjected to a pressure greater than the pressure therein during operation of the injector.

3. A method as claimed in claim 1, wherein the predetermined quantity of fuel is contained within a cylinder and a piston is displaced in the cylinder in an attempt to force the fuel into the fuel line.

4. A method as claimed in claim 3, wherein the displacement of the piston to a predetermined position in the cylinder indicates the success of said attempt and the presence of a fuel leakage.

5. In combination, a fuel injector of the type having a fuel discharge passage, a tip sealing valve capable of sealing the passage to control the discharge of fuel therethrough and means defining a path for the circulation of fuel therealong, said path including a part which lies adjacent the discharge passage, and a device for use in testing said fuel injection valve, said device comprising a valve body defining fuel inlet and fuel outlet ports and fuel supply and fuel return ports, said fuel supply port being connected to said circulation path on one side of said part adjacent the discharge passage and said fuel return port being connected to said circulation path on another side of said part adjacent the discharge passage, a piston displaceable in a cylinder in the body, the piston having apertures therethrough whereby, in one extreme position of the piston in the cylinder, the fuel inlet and the fuel supply ports are in communication with each other and the fuel outlet and the fuel return ports are in communication with each other, displacement of the piston from the first extreme position to the other extreme position in the cylinder progressively closing off said fuel supply port from the fuel inlet port and said fuel return port from the fuel outlet port and discharging the contents of the cylinder through a duct to the fuel supply port.

6. A combination as claimed in claim 5, in which the piston is displaceable in the cylinder by the action of a further piston mounted on the first piston and displaceable by fluid means in a further cylinder.

7. A combination as claimed in claim 6, including means for indicating the presence of the piston in said other extreme position.

8. A combination as claimed in claim 7, in which said means comprise a limit switch engageable by the piston only when the piston is in said other extreme position.

9. A combination as claimed in claim 6, including means for indicating the pressure in said duct.

10. A combination as claimed in claim 9, wherein said means comprises a switch actuable when the pressure in said duct exceeds a predetermined value.

11. A device used in the testing of a fuel injector of the type having a fuel discharge passage, a tip sealing valve capable of sealing the passage to control the discharge of fuel therethrough and means defining a path for the circulation of fuel therealong, said path including a part which lies adjacent the discharge passage, said device comprises a valve body defining fuel inlet and fuel outlet ports and fuel supply and fuel return ports, means for connecting said fuel supply port to said circulation path on one side of said part adjacent the discharge passage, means for connecting said fuel return port to said circulation path on another side of said part adjacent the discharge passage, a piston displaceable in a cylinder in the body, the piston having apertures therethrough whereby, in one extreme position of the piston in the cylinder, the fuel inlet and the fuel supply ports are in communication with each other and the fuel outlet and the fuel return ports are in communication with each other, displacement of the piston from the first extreme position to the other extreme position in the cylinder progressively closing off said fuel supply port from the fuel inlet port and said fuel return port from the fuel outlet port and discharging the contents of the cylinder through a duct to the fuel supply port.

12. A device as claimed in claim 11, in which the piston is displaceable in the cylinder by the action of a further piston mounted on the fist piston and displaceable by fluid means in a further cylinder.

13. A device as claimed in claim 12, including means for indicating the presence of the piston in said other extreme position.

14. A device as claimed in claim 13, in which said means comprises a limit switch engageable by the piston only when the piston is in said other extreme position.

15. A device as claimed in claim 12, including means for indicating the pressure in said duct.

16. A device as claimed in clam 15, wherein said means comprises a switch actuable when the pressure in said duct exceeds a predetermined value.

* * * * *